US007899779B1

(12) United States Patent
Oganesyan

(10) Patent No.: US 7,899,779 B1
(45) Date of Patent: *Mar. 1, 2011

(54) SECURITY SYSTEM FOR SYNCHRONIZATION OF DESKTOP AND MOBILE DEVICE DATA

(75) Inventor: Ashot K. Oganesyan, Moscow (RU)

(73) Assignee: SmartLine Inc., Moscow (RU)

( * ) Notice: Subject to any disclaimer, the term of this patent is extended or adjusted under 35 U.S.C. 154(b) by 394 days.

This patent is subject to a terminal disclaimer.

(21) Appl. No.: 12/050,750

(22) Filed: Mar. 18, 2008

Related U.S. Application Data

(63) Continuation of application No. 12/034,705, filed on Feb. 21, 2008.

(51) Int. Cl.
*G06F 7/00* (2006.01)
*G06F 17/00* (2006.01)

(52) U.S. Cl. .......... 707/609; 707/610; 707/617; 707/621

(58) Field of Classification Search ........................ None
See application file for complete search history.

(56) References Cited

U.S. PATENT DOCUMENTS

| 6,272,545 | B1 | 8/2001 | Flanagin et al. | |
|---|---|---|---|---|
| 2001/0054072 | A1 | 12/2001 | Discolo et al. | |
| 2008/0137593 | A1* | 6/2008 | Laudermilch et al. | 370/328 |
| 2009/0089417 | A1* | 4/2009 | Giffin et al. | 709/224 |

* cited by examiner

*Primary Examiner* — Jay A Morrison
(74) *Attorney, Agent, or Firm* — Bardmesser Law Group

(57) ABSTRACT

A system, method and computer program product for a system, method and computer program product for controlling synchronization between a stationary computer and a mobile device, including detecting connection of the mobile device to the computer; intercepting a request for synchronization of data between the mobile device and the computer; parsing a data stream that transfers data between the computer and the mobile device; during the parsing, identifying objects within the data stream; determining if a particular identified object is of a type that is approved for synchronization; and permitting a selective transfer between the computer and the mobile device of those objects that are approved.

12 Claims, 7 Drawing Sheets

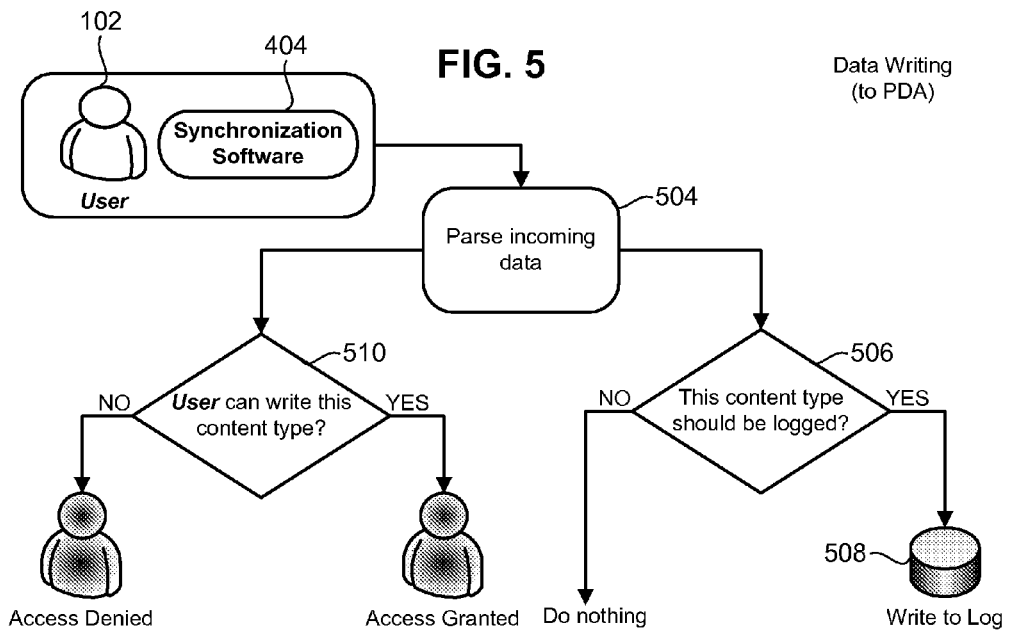
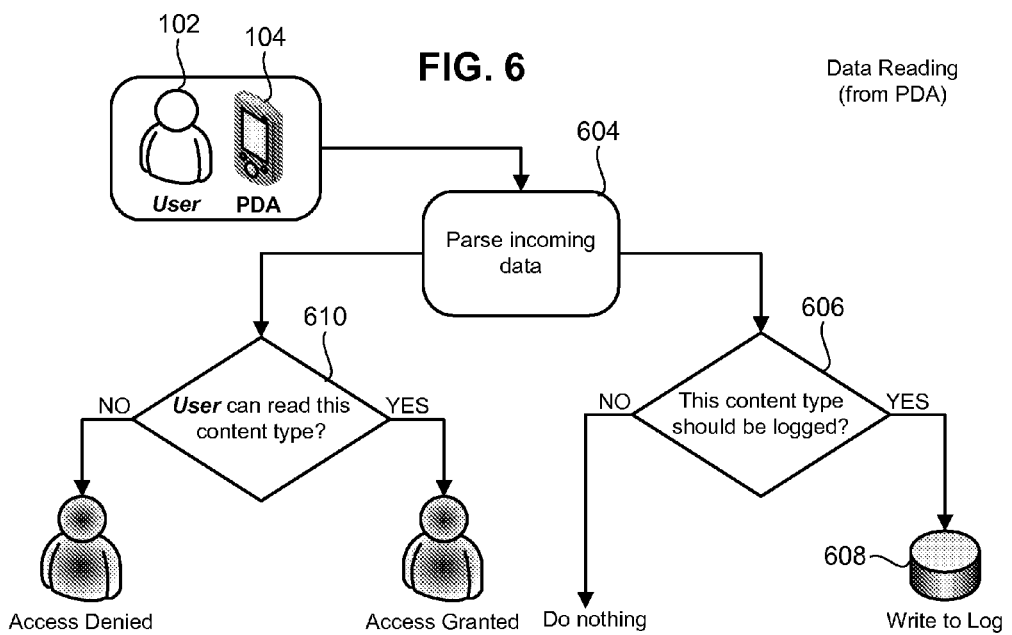

SECURITY SYSTEM FOR SYNCHRONIZATION OF DESKTOP AND MOBILE DEVICE DATA

CROSS-REFERENCE TO RELATED APPLICATION

This application is a continuation of U.S. patent application Ser. No. 12/034,705, filed 21 Feb. 2008, entitled SECURITY SYSTEM FOR SYNCHRONIZATION OF DESKTOP AND MOBILE DEVICE DATA, which is incorporated by reference herein in its entirety.

BACKGROUND OF THE INVENTION

1. Field of the Invention

This invention relates to a method, system and computer program product for controlling synchronization of data between mobile devices and desktop computers and servers.

2. Description of the Related Art

One of the problems that many IT departments at large and medium sized corporations face is security of data on the their desktops and on their server-based networks, particularly in view of many devices and "gadgets" that are available to users today. Such devices include SmartPhones, personal digital assistants (PDAs), pocket computers, BlackBerries, iPods, iPhones, and many similar devices. These capabilities of such devices, such as processing and storage capabilities, continue to increase, and many rank-and-file users desire to synchronize their PDAs and similar devices to, for example, their desktop computers.

Such synchronization is readily available, for example, using ActiveSync or HotSync software, where every time a device is connected to the computer, or inserted into a cradle, which is connected to a computer, a synchronization dialog starts between the device and the computer, and data can be transferred in both directions.

Of particular concern is the fact that many such devices have relatively robust operating systems, for example, Windows Mobile, or similar, which permits the file system of the device to be synchronized to the file system of the desktop computer. Other non-file objects, such as calendar, tasks, contacts, etc. can also be synchronized. In essence, Windows Mobile permits the PDA to act as a hard disk drive that has just been connected to the desktop computer, and to copy the entire file system onto the device.

The IT departments that face this problem essentially have two choices: one is to permit everything—in other words, users will be allowed to synchronize their devices to their local desktops without restrictions. Another is to ban the possibility of synchronization altogether, judging it to be an unacceptable risk. Neither approach is satisfactory—banning synchronization leaves many users irritated, while permitting unfettered synchronization is a security risk.

Accordingly, there is a need in the art for much finer degree of control over the ability of users to synchronize their portable devices to their desktop computers and/or corporate networks.

SUMMARY OF THE INVENTION

Accordingly, the present invention is related to a system, method and computer program product for control over synchronization of data between mobile and stationary computers and devices that substantially obviates one or more of the disadvantages of the related art.

In one aspect of the invention, there is provide a system, method and computer program product for controlling synchronization between a stationary computer and a mobile device, including detecting connection of the mobile device to the computer; intercepting a request for synchronization of data between the mobile device and the computer; parsing a data stream that transfers data between the computer and the mobile device; during the parsing, identifying objects within the data stream; determining if a particular identified object is of a type that is approved for synchronization; and permitting a selective transfer between the computer and the mobile device of those objects that are approved.

As a further option, the transferred objects can be mirrored to a network storage, and/or an audit trail of the transferred objects can be maintained. Objects of a approved type can include, e.g., calendar, contacts, notes and email bodies. Also, objects of an approved type can include email attachments. Objects of a non-approved type include file system objects, such as files and directories, and/or files larger than a predefined size. The types approved for synchronization are specified by a system administrator.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention. In the drawings:

FIGS. 5-6 illustrates another view of the parsing of the data stream between the remote device and the desktop computer.

DETAILED DESCRIPTION OF THE PREFERRED EMBODIMENTS

Reference will now be made in detail to the preferred embodiments of the present invention, examples of which are illustrated in the accompanying drawings.

Figure 1:
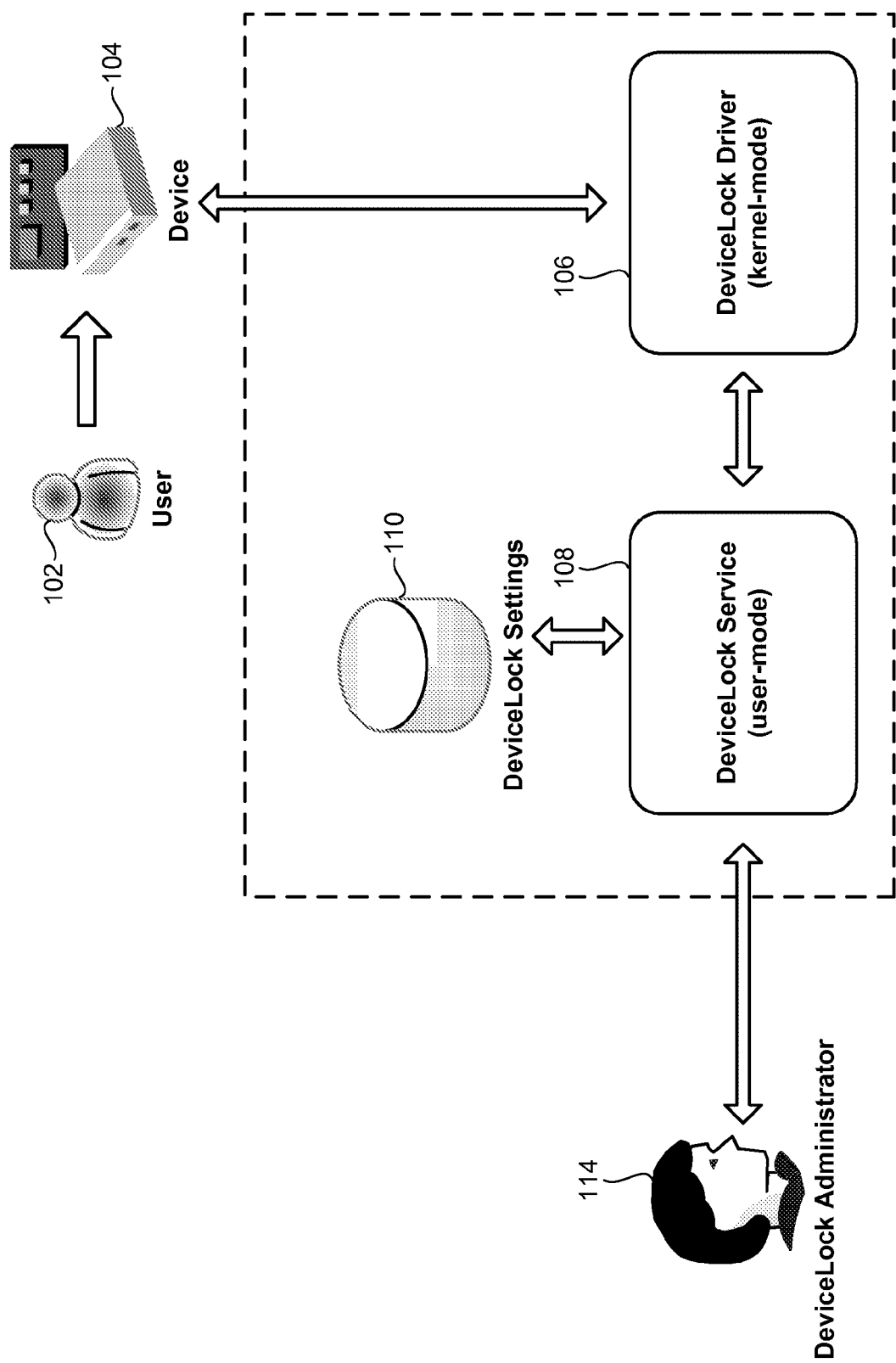
FIG. 1 shows an overall architecture for mobile device synchronization.

FIG. 1 illustrates an overall architecture into which the present invention fits. As shown in FIG. 1, a user 102 has a device 104, such as a smartphone, PDA, Blackberry, iPod, iPhone, etc. The device 104 connects to a desktop computer, such as through a USB port or by being plugged into a cradle, and then a kernel mode driver 106 is used to process communications to the device 104. An administrator 114 activates the DeviceLock service 108 with settings 110.

Figure 2:
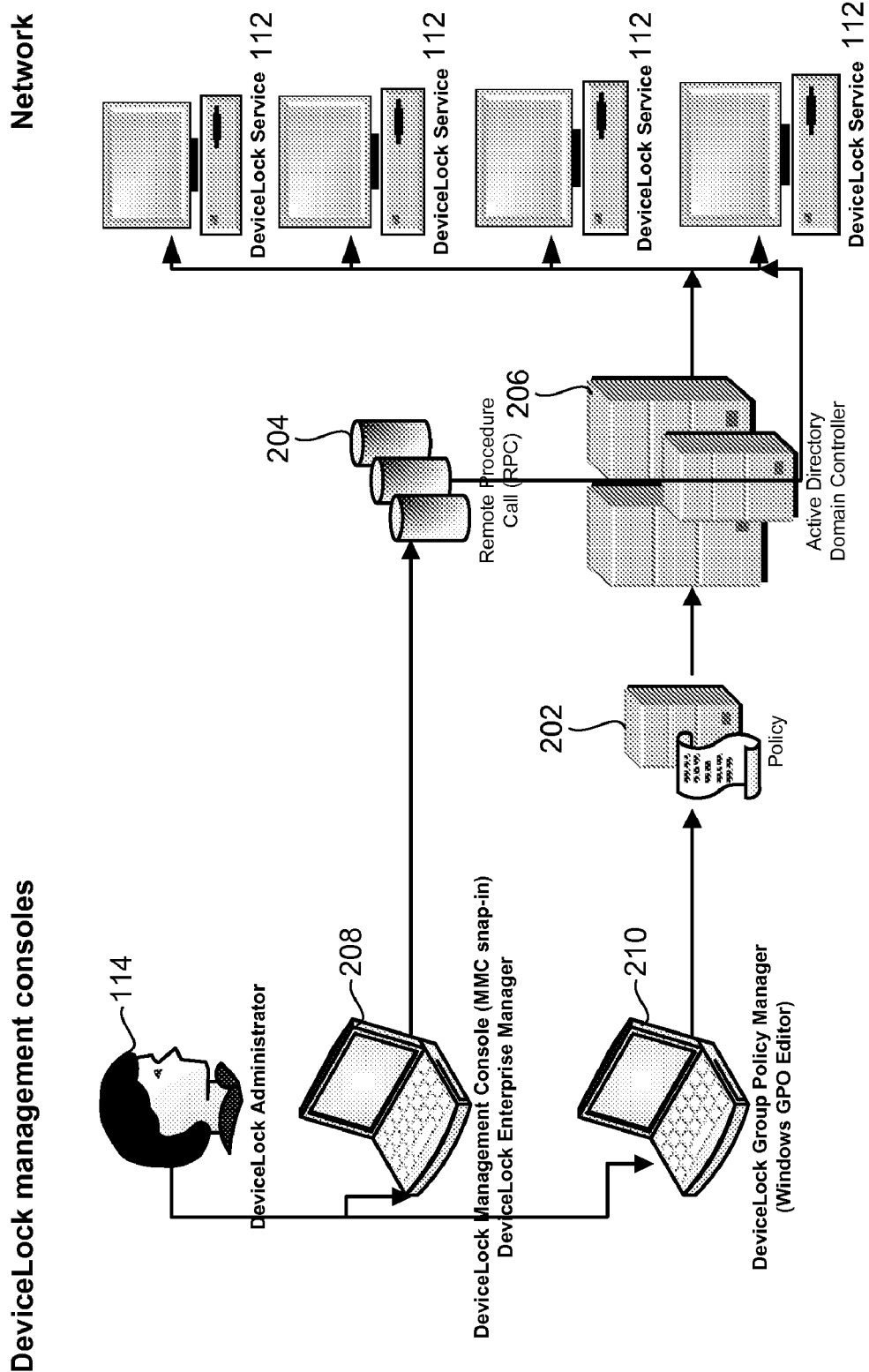
FIG. 2 illustrates a corporate network architecture into which the present invention fits in FIG. 3 illustrates various options a user has for synchronizing a remote device in a desktop device.

FIG. 2 illustrates a network architecture in which the present invention can be used As shown in FIG. 2, a number of desktop computers 112 are connected to a network. An administrator 114 has a console 208 for management of the settings that permit, or not permit, some or all the users some or all of the functions. A group policy manager 210 manages the policy 202204 in this figures is technology for remote procedure calls, and 206 is the Active Directory controller (in this example, a Microsoft product). Here, one management console works through RPCs directly with each computer, while another management console works through transferring of policies to the domain controller, and the domain controller then distributes the policies to the individual computers.

Figure 3:
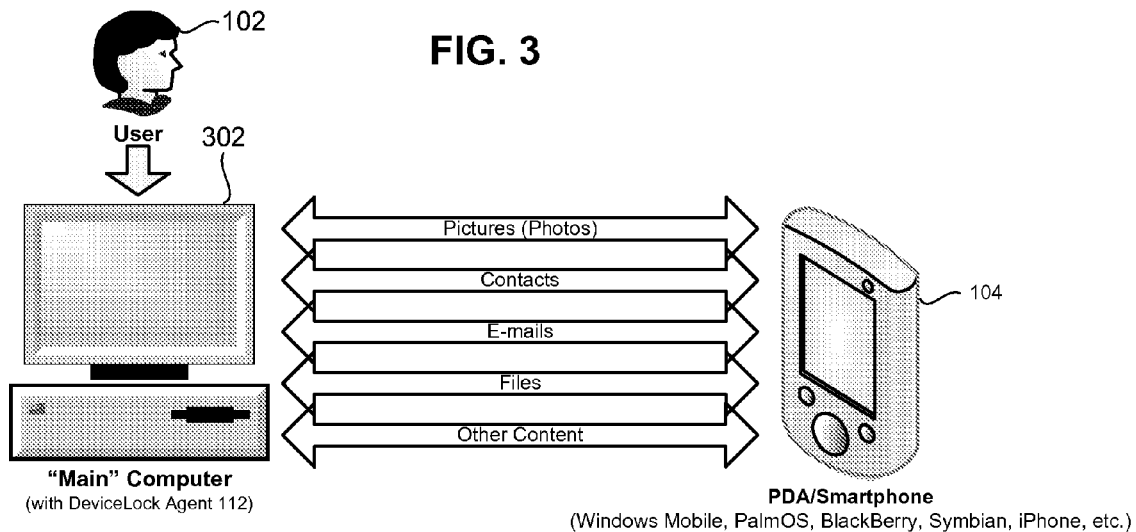

FIG. 3 illustrates some of the fine grain options that a user has for synchronizing his PDA/smartphone 104 and the computer 302 on which the agent/driver 112 is running For example, the administrator can allow, or not allow, synchronization of various email items, such as the body of the email, the attachments, some or all of the files, other types of contents, pictures, videos, email contacts, calendar, notes, and so on. The control can be exercised by file type, by object type, by object/file size, by relationship between the objects (for example, a file that is "just a file" in the sense of being part of the file system can be treated differently from a file that is an attachment to an email).

Figure 4:
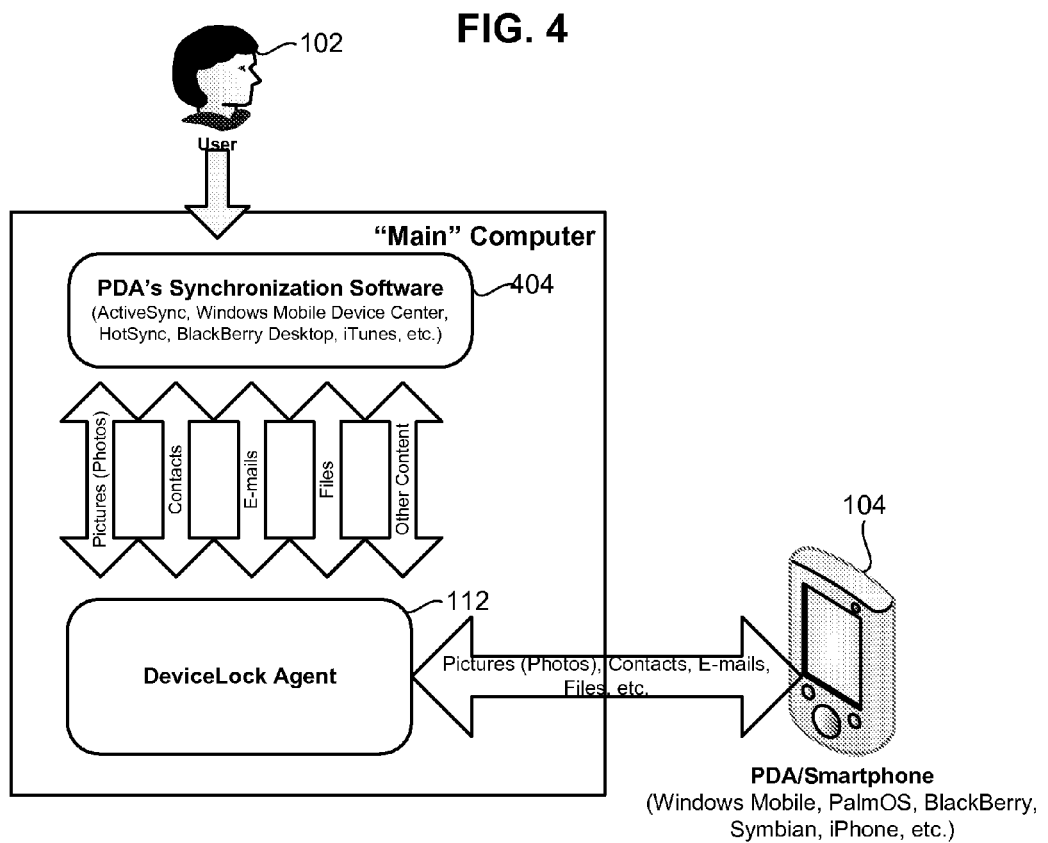
FIG. 4 is another illustration of parsing of the data stream between a remote device and a desktop computer.

FIG. 4 illustrates another aspect of the embodiment of the invention described earlier. As shown in FIG. 4, a main computer, such as 302, is running synchronization software 404. This could be such software as ActiveSync, HotSync, Blackberry desktop, iTunes, Windows mobile device center, and so forth. The PDA synchronization software 404 interfaces to the DeviceLock agent 112, which in turn permits or forbids synchronization of particular objects, such as files, emails, contacts, and so forth.

FIG. 5 illustrates an overall diagram of operation of the invention, where data is being written to the PDA 104. As shown in FIG. 5, user 102 activates synchronization software 404, either deliberately, or simply by connecting his PDA 104 to the computer 302. The agent 112 then parses the incoming data, see 504. It should be noted that most such synchronization protocols are somewhat analogous to XML type languages, and include the use of tags, although the present invention is not limited to XML type languages or the use of tags. The parsing therefore identifies the objects in the data stream, using the tags, and therefore can then make a determination of whether this is a type of object that is permitted for synchronization, or not. In step 510, the agent 112 determines whether this type of content is one that the user is permitted to synchronize. Also, in step 506, the agent 112 determines whether this is a transaction that needs to be logged.

It should be noted that many modern compliance systems require an audit trail. This can involve a record of all the objects that are being synchronized, who is doing the synchronization, to which device, the time stamps of the synchronization, and so forth. As a more robust alternative, everything that is being synchronized, or transferred down, to the device 104 can also be mirrored to network storage, such as server based storage, and to a database, such as SQL. Although the volume of data that needs to be stored may be large, this is essentially an infrastructure issue. As yet a further option, for relatively small files, the files themselves can be mirrored, while for relatively large files, a record of their synchronization can be generated, but the files themselves might not be copied.

It should also be noted that such systems as described herein are not intended to create an absolute barrier to someone who maliciously attempts to subvert corporate policies for data security—a user who deliberately tries to copy data that should not be copied can find other mechanisms for doing so, for example, by taking pictures of data displayed on a screen using his cell phone. Although, it is expected that the system as described herein serves as at least some barrier to malicious activity (and, in some cases, can spot and log unsuccessful attempts to copy data that should not copied).

Rather, the approach described herein is more appropriate for accidental data disclosures, where a user, or a group of users routinely synchronize large volumes of data to their PDAs, and then the PDA can be lost or compromised. Therefore, the approach described herein permits an administrator greater control over how users synchronize their data—permitting a compromise between the two ends of the spectrum, where most data that a person might need in "mobile form" is synchronizable (for example, contact, calendar, notes, short emails, and so forth), while data that is typically of little use on a PDA, or at least of questionable use (for example, large database files) would not be synchronizable.

Also, note that the administrator-defined settings may also be device specific. For example, a user might be able to synchronize files to his PDA, on the assumption that at least some work that the user might want to do can be performed on the PDA. On the other hand, if the device 104 is a smartphone with only minimal capabilities for manipulating files and working with them, then, in that case, the administrator might not permit synchronization of files to a device with such modest capabilities.

FIG. 6 illustrates an aspect of the invention that can include data synchronization from the device 104 to the desktop computer 302. This can be useful in preventing transfers of malware, such as infected files, downloader files, worms, Trojans, and so forth, since the device 104 itself might be infected. As further shown in FIG. 6, incoming data from the device 104 is parsed, similar to the manner described with reference to FIG. 5, to identify the objects embedded in the data stream. Based on the settings, the agent 112 determines whether the user is permitted to synchronize these types of objects, see 610. Also, the agent 112 determines if this is the type of content that needs to be logged, for example, for creation of an audit trail, see 606, and the earlier discussion of audits.

Figure 7:
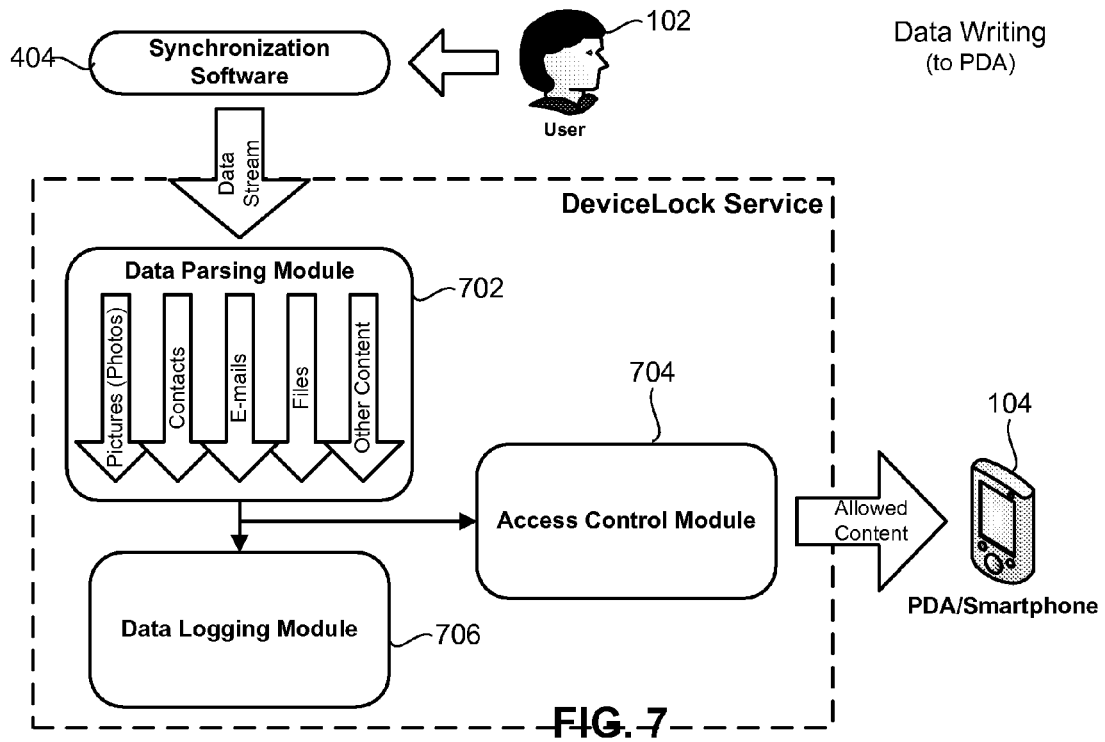
FIG. 7 illustrates the use of access control and data logging in the context of one embodiment of the invention.

FIG. 7 illustrates how the synchronization software and the data parsing module fit into the architecture of the invention. As shown in FIG. 7, the synchronization software 404 interfaces to the data parsing module 702, which in turn transmits information to the data logging module 706 (see earlier discussion of audit trails), and to the access control module 704. The access control module 104 then permits the allowed content to be transmitted to the device 104. The data parsing module is responsible for identification, in the data stream, of the object, such as files, emails, calendar items, contacts, and so forth.

Figure 8:
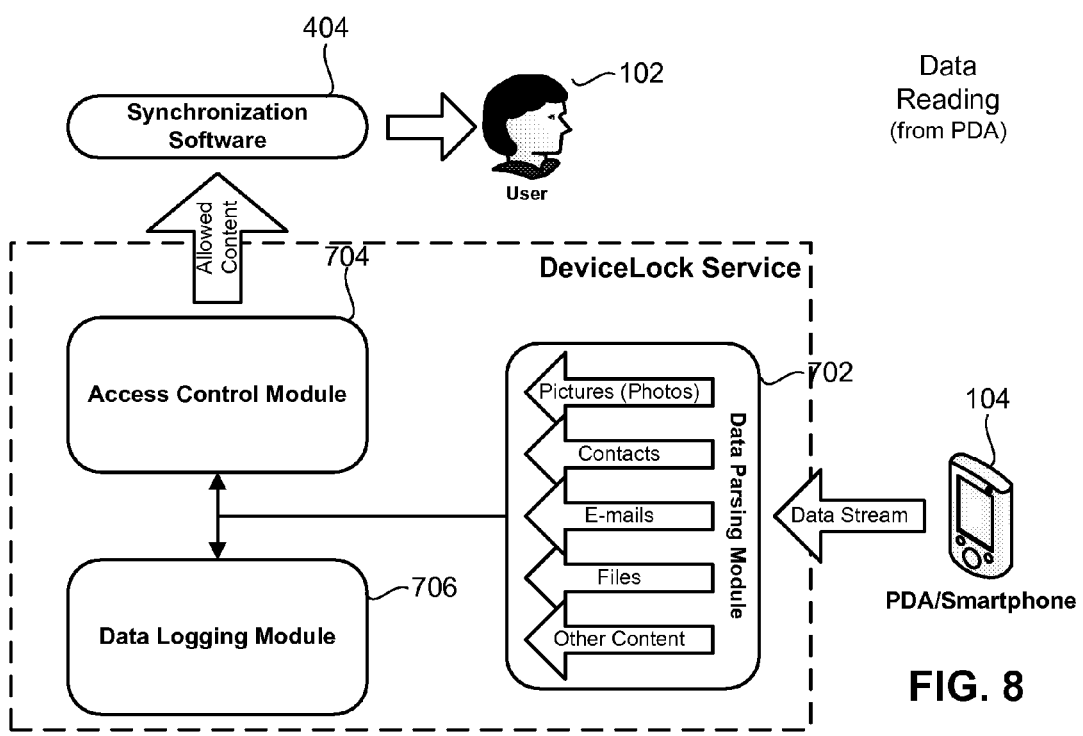
FIG. 8 illustrates a similar process where the data stream is from the PDA from the remote device to the desktop computer.

FIG. 8 illustrates a similar process, except the flow of the data is from the PDA 104 to the desktop computer 302.

Essentially, the function of the elements in FIG. 8 is the same as in FIG. 7, the only difference is the direction of the data flow.

Figure 9:
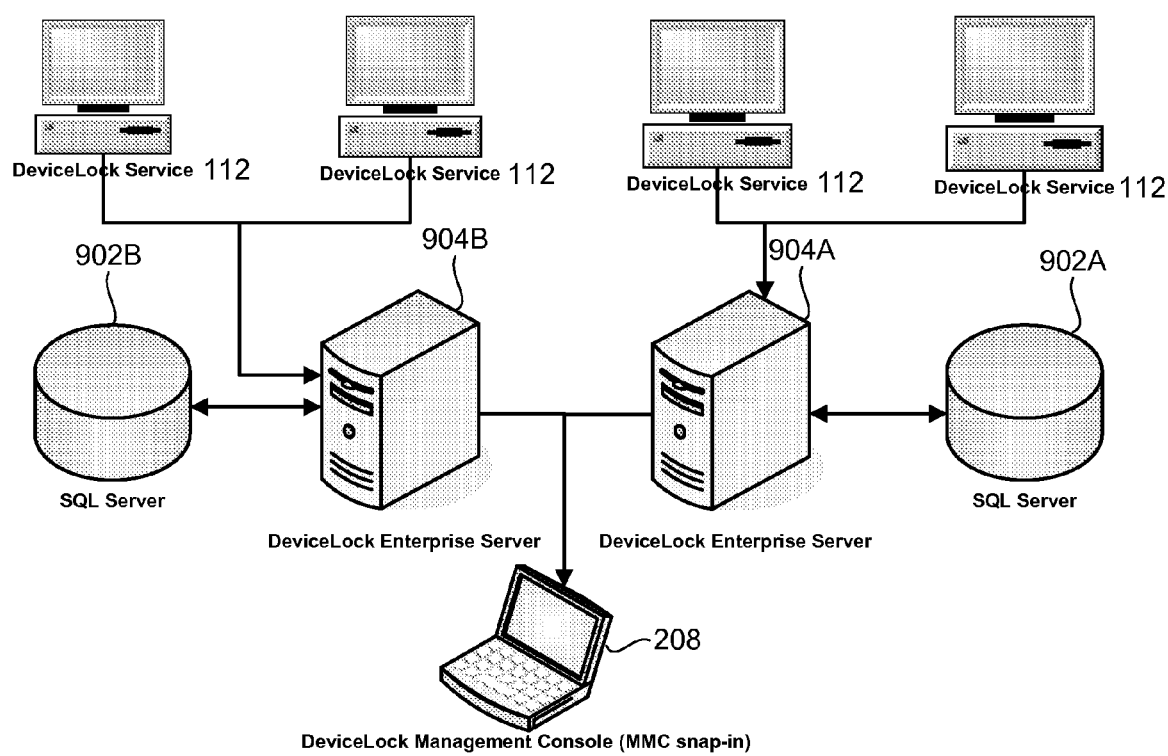
FIG. 9 shows another view of how the invention can fit into a network architecture.

FIG. 9 illustrates how the present invention can fit into network architecture, for example, a corporate data network. As shown in FIG. 9, a number of desktop computers are running the DeviceLock service 112, or the agent 112. These computer are connected to a DeviceLock Enterprise Server, which collects the logs and the data mirroring information from the local computers 112, and saves to the database 902. Also, the server 904 can provide its information to the management console/administrator. Thus, the administrator typically connects not to the SQL server directly, but through the server 904, which acts as a proxy. A management console 208 is used by the administrator to control various aspects of the architecture, such as the settings for the users that indicate which type of content and which types of objects the users are permitted to synchronize to their devices 104.

Figure 10:
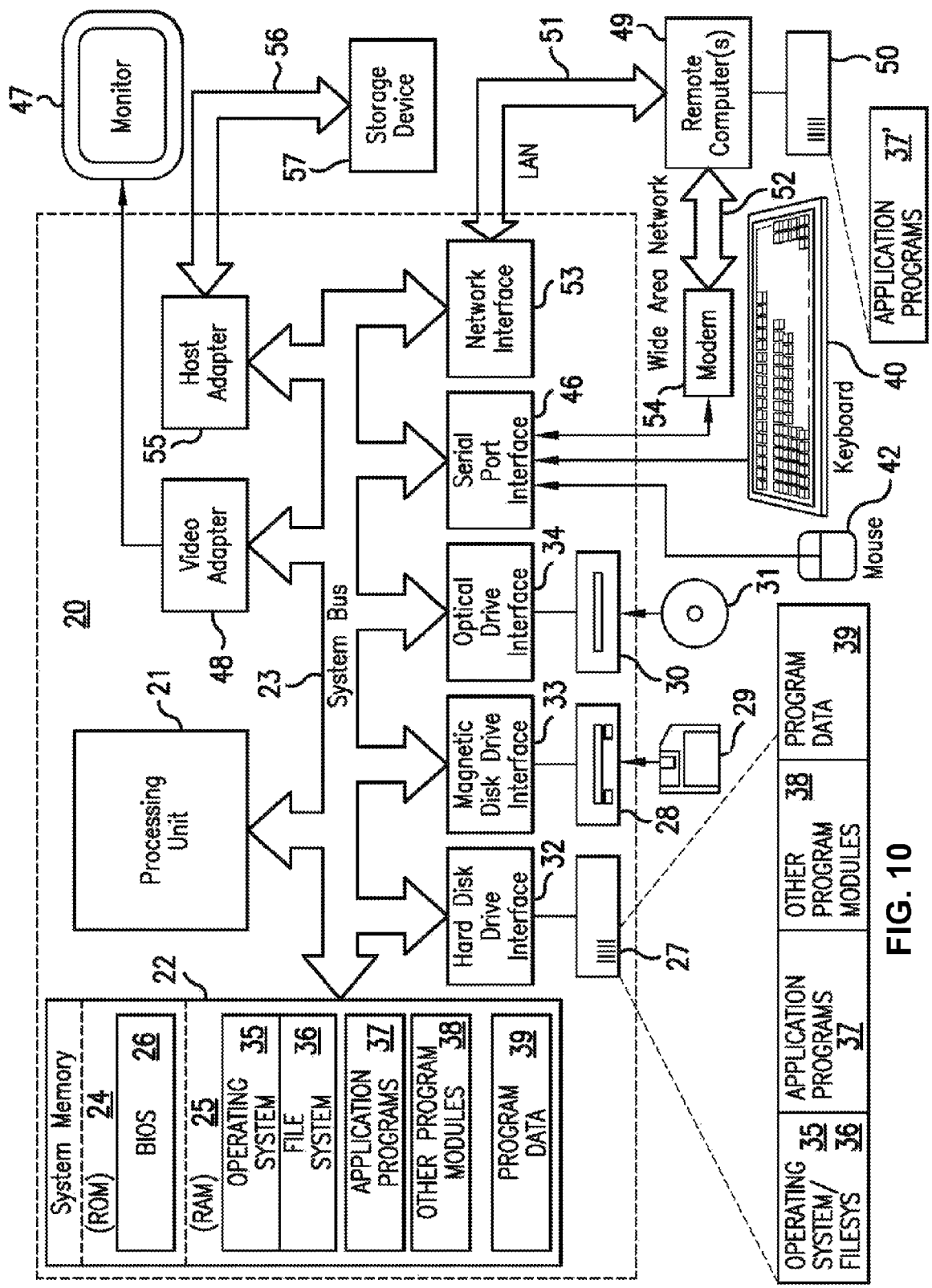
FIG. 10 illustrates an exemplary computer system on which the invention may be implemented.

With reference to FIG. 10, an exemplary system for implementing the invention includes a general purpose computing device in the form of a computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 6. The logical connections depicted in FIG. 6 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for controlling synchronization between a local computer and a mobile device, the method comprising:
   detecting a direct connection of the mobile device to a port of the local computer;
   intercepting a request for synchronization of data between the mobile device and the computer;
   parsing a data stream that transfers files exchanged between the local computer and the mobile device;
   during the parsing, identifying files within the data stream;
   determining if a particular identified file is of a type that is approved for synchronization; and
   in response to an authorization provided by an external administrator through a domain controller, permitting a selective transfer of the approved files containing user-specific approved content and matching device-specific capabilities between the computer and the mobile device.

2. The method of claim 1, further comprising mirroring the transferred files to a network storage.

3. The method of claim 1, further comprising maintaining an audit trail of the transferred files.

4. The method of claim 1, wherein files of an approved type reflect calendar, contacts, notes and email bodies.

5. The method of claim 4, wherein files of an approved type include email attachments.

6. The method of claim 1, wherein files of a non-approved type include system objects.

7. The method of claim 1, wherein the system objects include files and directories.

8. The method of claim 1, wherein files of a non-approved type include files larger than a predefined size.

9. The method of claim 1, wherein the file types approved for synchronization are specified by a system administrator.

10. A system for controlling synchronization between a local computer and a mobile device according to the method of claim 1, the system comprising:
   a processor;
   memory;
   computer code loaded into the memory for execution on the processor, for implementing the steps of claim 1.

11. A non-transitory computer useable recording medium having computer executable program logic stored thereon for executing on a processor, the program logic comprising computer program code for implementing the steps of claim 1.

12. A method for controlling synchronization between a local computer and a mobile device, the method comprising:
   detecting a direct connection of the mobile device to a port of the local computer;
   intercepting a request for synchronization of data between the mobile device and the computer;
   parsing a data stream that transfers files exchanged between the local computer and the mobile device;
   during the parsing, identifying files within the data stream;
   determining if a particular identified file is of a type that is approved for synchronization; and
   in response to an authorization provided by an external administrator through a remote procedure call, permitting a selective transfer of the approved files conforming to user settings based on device-specific capabilities and user-specific allowed content, between the computer and the mobile device.

* * * * *